United States Patent [19]

Vargiu et al.

[11] 4,221,829
[45] Sep. 9, 1980

[54] METHOD FOR PREPARING A GRANULAR THERMOSETTING NOVOLAK RESIN MOLDING COMPOSITION

[75] Inventors: Silvio Vargiu, Casatenovo; Pierluigi Manzoni, Codogno, both of Italy

[73] Assignee: Euteco S.p.A., Milan, Italy

[21] Appl. No.: 4,527

[22] Filed: Jan. 18, 1979

[30] Foreign Application Priority Data

Jan. 19, 1978 [IT] Italy .............................. 19416 A/78

[51] Int. Cl.² ...................... B32B 27/42; C08L 61/10
[52] U.S. Cl. ................................. 427/222; 428/407; 525/502
[58] Field of Search ............ 260/844, 32.8 A, 32.8 R; 264/5, 7, 13; 427/222; 428/407; 525/502

[56] References Cited

U.S. PATENT DOCUMENTS 3,971,863   7/1976   Calkins .................................. 428/407

Primary Examiner—Theodore E. Pertilla
Attorney, Agent, or Firm—Sughrue, Rothwell, Mion, Zinn and Macpeak

[57] ABSTRACT

A granular thermosetting novolak resin composition free from a tendency to release dust during handling and transformable into molded articles free from surface defects, is obtained by forming the composition into granules of from 2 to 9 mm in size, mixing said granules with 0.7–2.5 wt. % of a liquid mixture of acetone and polymers of alkyl esters of acrylic and methacrylic acids, and drying the thus impregnated granules.

8 Claims, No Drawings

METHOD FOR PREPARING A GRANULAR THERMOSETTING NOVOLAK RESIN MOLDING COMPOSITION

The present invention relates to the preparation of a granular thermosetting composition including a novolak phenolic resin, free from a tendency to release dust and able to be formed into finished parts by injection moulding.

Moulding compositions including a novolak phenolic resin constituted by a condensation product of phenol with formaldehyde which hardens under heat in the presence of substances like hexamine, are known in the art. Other constituents of these compositions are hardening catalysts, usually chosen from among the oxides of alkaline earth metals, inert fillers and possibly also small amounts of lubricants, dyes and pigments.

It is known that these compositions melt and become fluid when heated, then harden irreversibly at a higher temperature.

Compositions containing a novolak phenolic resin can be moulded by the injection technique, in so far as they have a sufficiently long working time in the fluid state (or plastic life), and provided that they harden completely at temperatures higher than those at which these compositions become fluid.

In order to improve their thermal stability in the fluid state, it is usual to add to the compositions small amounts of oxides and acids of boron, possibly combined with hexamine, for example boric anhydride, orthoboric and metaboric acids and hexamine metaborate. It is also possible to add to the composition a stabilizer-catalyst mixture made up of an amine chosen from aliphatic compounds having two or more amino groups ($NH_2$), aromatic compounds having one amino group linked to an aromatic ring and aromatic compounds having two or more amino groups linked to one or more aromatic rings, and metaboric or orthoboric acid.

The moulding compositions must be in a physical form suitable for working and transformation into moulded articles. For this purpose the composition are generally granulated.

Thus, according to a known method, the novolak phenolic resin and all the other constituents of the composition are homogenized in a suitable mixer, and the homogenized mixture is calendered and transformed into a sheet. The latter is crushed and the granules sieved to recover the fraction having the required size.

According to another known method, the composition is melted in a screw extruder and the extrudate is cooled and cut into granules of uniform size.

In each case the resulting granules release fine dust with consequent pollution of the working surroundings.

Consequently, it was suggested to treat the granules with suitable substances, such as zinc stearate and dibutyl phthalate, capable of forming a coating film. Although such a method on the one hand prevents the release of dust, on the other hand it leads to a worsening on the aesthetic characteristics of the manufactured articles on account of their opaqueness and the formation of surface stains. This fact does not allow the use of granular moulding compositions thus treated in various fields of application, such as for example, in that of hygienic-sanitary articles.

It was also suggested to impregnate the granules with small amounts of substances such as phenol and acetone, to form by dissolving-solidification mechanism a thin surface layer resistant enough to prevent the release of dust. However, such a method is not completely satisfactory, since it still brings about a slight worsening on the aesthetic characteristics of the molded articles, and also a worsening on the molding properties and the mechanical properties of the molded articles.

It has now been found that it is possible to avoid these draw backs and to prepare compositions suitable for injection molding, in the form of granules which do not release dust and which can be transformed into molded articles of high aesthetic and mechanical characteristics.

Thus, the invention provides a method for preparing a granular thermosetting molding composition including a novolak phenolic resin with modified surface characteristics, characterized by forming said molding composition into granules of from 2 to 9 mm in size and mixing said granules with an amount of from 0.7 to 2.5 wt.%, based on the weight of the granules, of a mixture of acetone and one or more polymers of alkyl esters of acrylic and methacrylic acids having from 1 to 5 carbon atoms in the alkyl radical, said polymers being present in the mixture in an amount of from 1 to 20% by weight, at a temperature such as to maintain said mixture in liquid form and for a period such as to insure absorption of said mixture by said granules, and drying said granules to substantially remove said acetone, whereby the surface of said granules is modified to render the granules free from a tendency to release dust during handling.

The moulding composition suitable for the purposes of the present invention, generally contain from 15 to 50 wt.% of novolak phenolic resin, from 3 to 10 wt.% of hexamine, from 0.5 to 2 wt.% of alkaline earth metal oxide and one or more inert fillers. The moulding composition generally contains small amounts of conventional additives, such as lubricants, dyes and pigments.

The novolak phenolic resin is usually obtained by condensation of formaldehyde with phenol in a molar ratio of from 0.8:1 to 0.98:1, in the presence of a mineral or organic acid as catalyst.

The alkaline earth metal oxide is preferably calcium or magnesium oxide. The inert fillers can be of an organic or mineral nature, such as for example, wood flour, cellulose, organic fibres and fabrics, paper fibre, asbestos, mica, fluorite, talc, diatomaceous earth and rock flour.

The composition generally contains from 0.5 to 3 wt.% of lubricant, preferably selected from waxes, stearic acid and its esters, and zinc, calcium and magnesium stearates.

The composition preferably contains from 1 to 4 wt.% (typically 2.5 wt.%) of the aforesaid stabilizer-catalyst mixture, where the ratio between the number of amino groups and the number of acid equivalents in said mixture is from 0.01:1 to 0.3:1. It is also possible to use only ortho-or metaboric acid, in amounts typically of the order of 2 wt%.

The composition may be reduced to granules by means of the calendering or extrusion technique previously described, or by an other method known in the art.

The granules are then mixed with the liquid mixture previously defined, added in an amount of from 0.7 to 2.5 wt.% with respect to the weight of the granules. It should be noted that an amount of added mixture lower than 0.7 wt.% does not yield useful results, since the granules keep their tendency to release dust. Amounts higher than 2.5 wt.% are harmful since they bring about a worsening on the properties of the molding composition. The best results are generally obtained with an amount of added mixture of the order of 1.5% by weight, based on the weight of the granules.

In practice the granules and the mixture in liquid form are loaded into a suitable mixer, and the whole is mixed, preferably at ambient temperature (20°–30° C.) or approximately ambient temperature, for a period sufficient to insure absorption of the liquid. The mixing times are typically of the order of 5–30 minutes.

The liquid mixture preferably contains about 5 wt.% of the aforesaid polymers. These acrylic homo- and copolymers, such as polymethyl methacrylate, preferably have a low molecular weight and may be chosen from the commercial products conventionally used in the coating field. Excellent results have been obtained when using the product commercialized under the Trade Name Modaflow by the Monsanto Company and the product commercialized under the Trade Name Resimix by the Victor Wolf Lmt. Company. In particular the product Modaflow has a SUS viscosity at 210° F. of the order of 5,000 and a refractory index of 1.4130–1.4190, as measured at 25° C. in 40% solution in 2,4,4-trimethylpentane. The product Resimix has a viscosity at 65° C. of the order of 4,000–8,000 cps and a density of 0.92–1.02 g/ml.

The granules thus coated are then dried. The drying is generally carried out at a temperature of at least 40° C. The drying temperatures should preferably not exceed values of the order of 70° C., and are typically of the order of 60° C. The drying treatment may advantageously be carried out by flowing a stream of hot gas, such as nitrogen or air, through the granules. In practice the drying may be carried out in a rotating drum or other suitable apparatus. The drying times are typically of the order of 1–10 minutes.

The granules thus treated are free-flowing and free from a tendency to release dust, and have high aesthetic characteristics and high impact and abrasion resistance. These granules can be converted into molded articles by the conventional molding techniques, such as injection molding, and the articles thus obtained have high mechanical and aesthetic characteristics.

Moreover, as will be shown in the following Examples, the treatment of the invention does not substantially alter the properties of the composition, such as the flow index and the hardening time.

EXAMPLE 1 (COMPARATIVE)

A moulding composition is prepared having the following composition, given in parts by weight: novolak phenolic resin 40.0, hexamine 6.8, magnesia 1.0, lime 0.5, stearin 1.0, zinc stearate 1.5, induline 1.8, diatomaceous earth 6.0, talc 6.0, wood flour 33.2, triethylenetetramine 0.5, orthoboric acid 1.5.

The novolak phenolic resin used is obtained by condensing formaldehyde with phenol in a 0.91:1 molar ratio, in an aqueous medium and in the presence of oxalic acid as catalyst. This resin has the following properties:

| viscosity at 25° C. in ethanol in a 1:1 weight | |
|---|---|
| ratio: | 60 cps |
| melting point (capillary): | 69° C. |

The composition is loaded into a screw-extruder, heated uniformly to 110° C. and extruded. The extrudate is cooled and cut into regular granules 6 mm in size.

The granules are subjected to the following tests:
(A) Disc fluidity;
(B) Flow index;
(C) Hardening time.

More particularly:

(A) The "disc fluidity" is determined in the following way:

A hydraulic press equipped with a pressure reducer, and a disc-shaped die with diameter of 34 cm, subdivided into seven concentric circles, is used.

The plates of the press are heated electrically, and the operation conditions are as follows: temperature 160°–165° C.; total pressure applied 30,000 kg; time 60 seconds.

50 grams of the composition under examination are placed at the centre of the die and the speed of descent of the piston in its final closing step is regulated to 0.3 cm/sec. The time between the placing of the composition in the die and the application of pressure is 10±0.5 seconds. After 60 seconds the sample is extracted in the form of a thin disc the diameter of which depends on the fluidity of the composition under examination.

The fluidity, or flowability, of the composition being examined is expressed as the number of circles impressed on the disc excluding the first, taken as zero value.

(B) The flow index is determined in the following way:

A hydraulic press is used equipped with a pressure reducer and an open chromium plated die in the form of a small beaker, type UNI 4272.

The plates of the press are heated electrically and the press is operated under the following conditions: temperature 160°–165° C., total pressure applied 5,000 kg.

A metered quantity of the composition under examination is placed in the cavity of the die and pressure is applied. At the moment when the needle of the manometer, connected to the press, shows an increase in pressure, the chronometer is started. When the upper plate of the press has finished its descent the chronometer is stopped. The intervening time, expressed in seconds, is the flow index.

(C) Operation is as in test B. The time between the closing of the press and the formation of a small beaker free from surface defects (bubbles), expressed in seconds, is the hardening time.

The results of the experiments carried out on the granular composition of Example 1 are shown in the Table.

The granular composition has a tendency to release a fine dust.

EXAMPLE 2

0.5 kg of the granules of Example 1 are placed in a rotating homogenizer, 10 grams of additive are added and the whole is mixed for 10 minutes at ambient temperature. The additive consists of 95 parts by weight of acetone and 5 parts by weight of acrylic polymer commercialized under the Trade Name Modaflow.

The coated granules are then heated in a rotating drum by means of a stream of air having an inlet temperature of 90° C. and an outlet temperature of 25°–30° C. The heat treatment time is 2 minutes. The granules are then subjected to Tests A to C. The results are shown in the Table.

EXAMPLE 3

The run of Example 2 is repeated by using 5 grams of additive. The results are shown in the Table.

EXAMPLE 4 TO 6 (COMPARATIVE)

The run of Example 2 is repeated by using respectively 2, 15 and 25 grams of additive. The results are shown in the Table.

EXAMPLE 7 (COMPARATIVE)

The run of Example 2 is repeated by using 10 grams of an additive consisting of acetone. The results are shown in the Table.

In Examples 2, 3,5,6 and 7 the treated granules were free from a tendency to release dust, whereas the granules obtained in Example 4 had a tendency to release a fine dust.

The granules of Example 5 and 6 had unsatisfactory properties, and especially unsatisfactory hardening times.

As to the aesthetic quality of the moulded articles best results were obtained when using the granules of Examples 2 and 3. In particular, when valuating on an empirical scale the aesthetic quality of the articles of Examples 2–3 and 7, the results are higher by about 30% in Examples 2–3.

TABLE

| Example | Disc fluidity | Flow index | Hardening time |
|---|---|---|---|
| 1 | 6 | 6 | 45 |
| 2 | 6 | 6 | 45 |
| 3 | 6 | 6 | 45 |
| 4 | 6 | 6 | 45 |
| 5 | 7 | 8 | 60 |
| 6 | >7 | 10 | 80 |
| 7 | 6 | 4 | 45 |

Results similar to those of Example 2 and 3 were obtained when using respectively 5 and 10 grams of a mixture of acetone (95 wt.%) and Resimix (5 wt.%).

We claim:

1. A method for preparing a granular thermosetting molding composition including a novolak phenolic resin with modified surface characteristics, which comprises forming said molding composition into granules of from 2 to 9 mm in size and mixing said granules with an amount of from 0.7 to 2.5 wt.%, based on the weight of the granules, of a mixture of acetone and one or more polymers of alkyl esters of acrylic and methacrylic acids having from 1 to 5 carbon atoms in the alkyl radical, said polymers being present in the mixture in an amount of from 1 to 20% by weight, at a temperature such as to maintain said mixture in liquid form and for a period such as to insure absorption of said mixture by said granules, and drying said granules to substantially remove said acetone, whereby the surface of said granules is modified to render the granules free from a tendency to release dust during handling.

2. The method of claim 1, wherein said novolak phenolic resin is included in an amount from 15 to 50 wt.% based on the weight of the molding composition and wherein the molding composition further includes from 3 to 10 wt.% of hexamine, from 0.5 to 2 wt.% of alkaline earth metal oxide, and one or more inert fillers, based on the weight of the composition.

3. The method of claim 1, wherein said mixture contains about 5 wt.% of polymers.

4. The method of claim 1, wherein said mixture is used in an amount of the order of 1.5 wt.% with respect to the weight of the granules.

5. The method of claim 1, wherein said mixing is carried out at 20°–30° C. for 5–30 minutes.

6. The method of claim 1, wherein said drying is carried out at a temperature of at least 40° C.

7. The method of claim 1, wherein said drying is carried out at a temperature of from 40° to 70° C.

8. The method of claim 7, wherein said drying is carried out by flowing through the granules a stream of hot gas for a period of from 1 to 10 minutes.

* * * * *